United States Patent
Jakob

(10) Patent No.: US 6,374,462 B1
(45) Date of Patent: Apr. 23, 2002

(54) FASTENER FOR JUNCTION POINTS OF CONVEYOR BELTS

(75) Inventor: Horst Jakob, Deaux (FR)

(73) Assignee: ASER, Saint-Chamond (FR)

( * ) Notice: Subject to any disclaimer, the term of this patent is extended or adjusted under 35 U.S.C. 154(b) by 0 days.

(21) Appl. No.: 09/719,394
(22) PCT Filed: Apr. 11, 2000
(86) PCT No.: PCT/FR00/00928
   § 371 Date: Mar. 14, 2001
   § 102(e) Date: Mar. 14, 2001
(87) PCT Pub. No.: WO00/61967
   PCT Pub. Date: Oct. 19, 2000

(30) Foreign Application Priority Data

Apr. 12, 1999 (FR) .............................................. 99 04571

(51) Int. Cl.⁷ ............................ F16G 3/02; B65G 15/30
(52) U.S. Cl. ...................... 24/33 P; 24/33 R; 24/33 B; 474/256
(58) Field of Search ................................ 24/33 P, 31 R, 24/33 B, 33 M, 33 F, 33 R; 474/253, 255, 256

(56) References Cited

U.S. PATENT DOCUMENTS

| 2,224,532 A |   | 12/1940 | Ziller |
|---|---|---|---|
| 3,438,096 A | * | 4/1969 | McComb ..................... 24/33 B |
| 4,344,209 A |   | 8/1982 | Harwood |
| 4,653,156 A | * | 3/1987 | Stolz et al. .................. 24/33 R |
| 4,671,403 A | * | 6/1987 | Schick ........................ 24/33 P |
| 5,095,590 A | * | 3/1992 | Schick ........................ 24/33 B |
| 5,638,582 A | * | 6/1997 | Klatt et al. .................. 24/33 P |
| 6,053,308 A | * | 4/2000 | Vogrig et al. ................ 24/33 P |

FOREIGN PATENT DOCUMENTS

| DE | 832 366 | 2/1952 |
|---|---|---|
| FR | 2.163.833 A | 7/1973 |

* cited by examiner

Primary Examiner—Victor N. Sakran
(74) Attorney, Agent, or Firm—Browdy and Neimark, P.L.L.C.

(57) ABSTRACT

The fastener comprises curved incorporated claws (4) serving to fix it to one end of a conveyor belt. The lower fixation plate of the fastener comprises curved raised edges (6) intended to make the points of the claws (4) enter under the small bars of ports (5) arranged by shearing and stamping in the lower fixation plate. The points of the claws (4) are locked along the lower front and back ridges (9) by the flattening of the small bars of the ports (5) during the final tightening of the fasteners during their fixation on the end of a conveyor belt.

3 Claims, 5 Drawing Sheets

FASTENER FOR JUNCTION POINTS OF CONVEYOR BELTS

The present application is the national stage under 35 U.S.C. 371 of PCT/FR00/00928, filed Apr. 11, 2000.

The invention relates to fasteners for conveyor belt joints, belts and similar products, which comprise hinge elements and are likely to be fixed astride one end of the conveyor belt, the hinge elements being able to be placed between similar hinge elements belonging to a similar fastener at the other end of the conveyor belt, the two fasteners being linked by a linking and articulation pin passing alternately in a hinge element belonging to one of the two fasteners and in a hinge element belonging to the other of the two fasteners, and so on.

The fasteners of this general type can be linked to a conveyor belt end by various known means such as rivets, brads, twin point staples, nut and screw systems. Certain fasteners can be linked directly, without using separate fixation organs, thanks to the claws which are part of the fastener, which are attached in the thickness of the conveyor belt when the fastener is tightened on one end of the conveyor belt.

Figure 1:
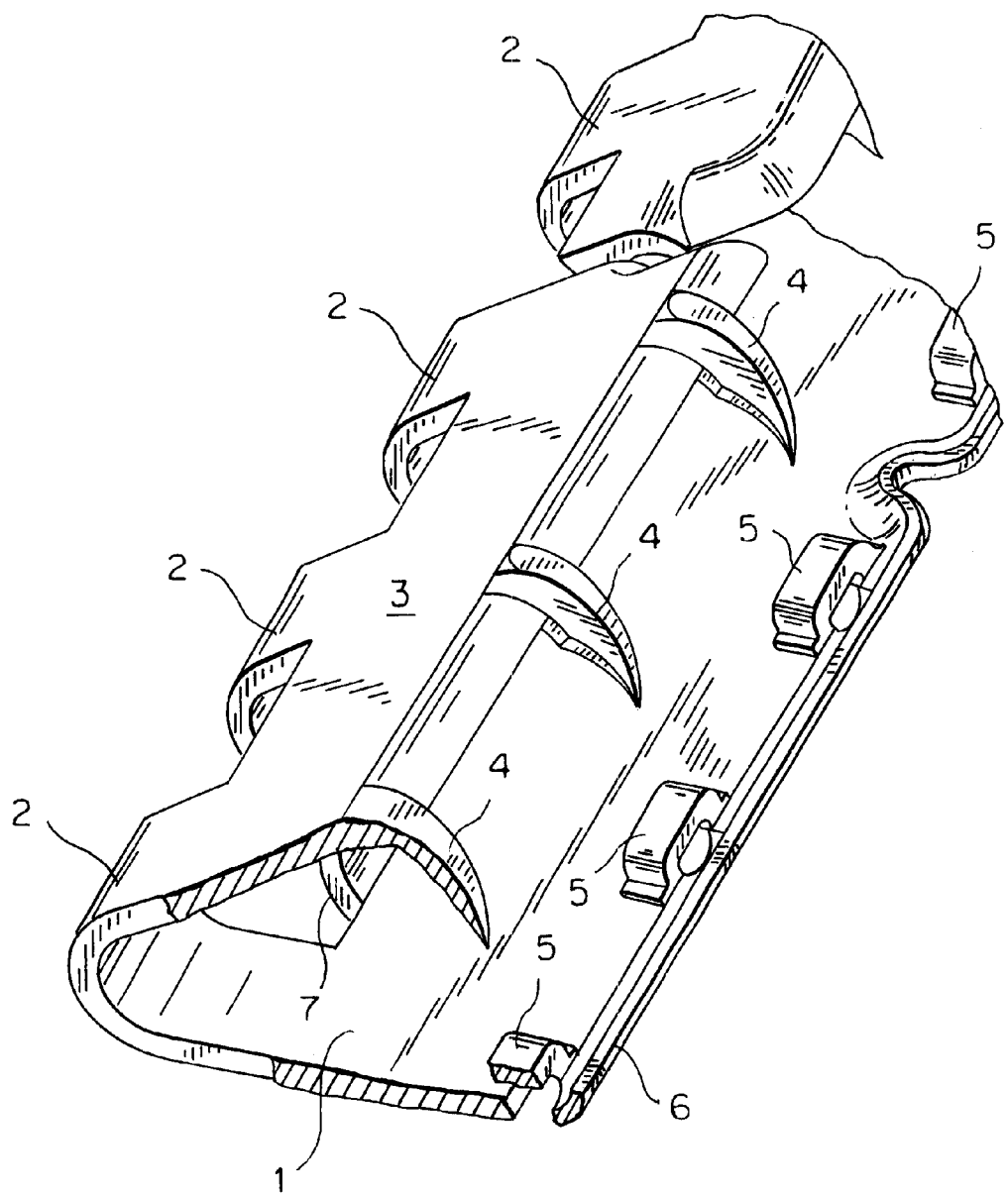
Figure 2:
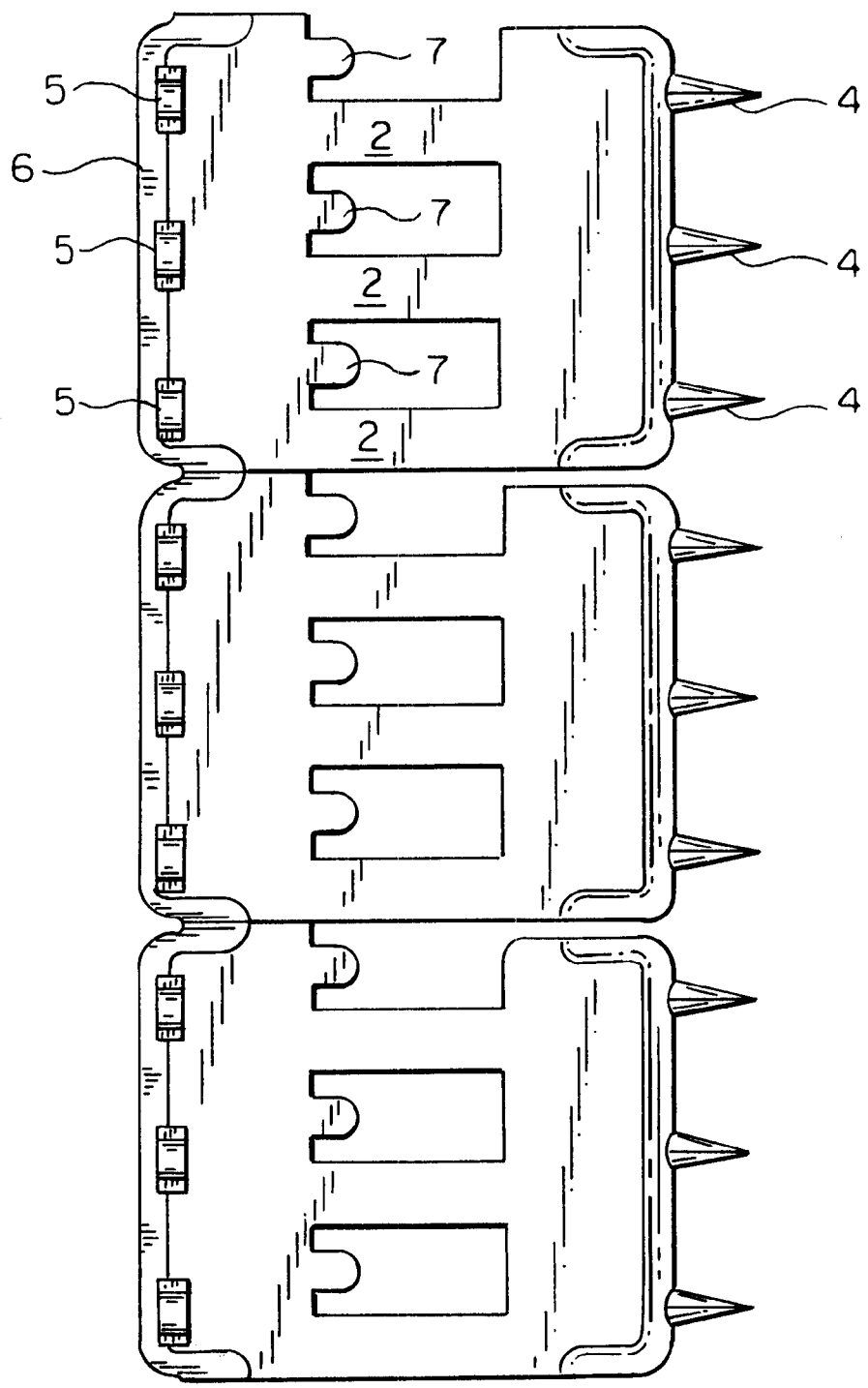
Figure 3:
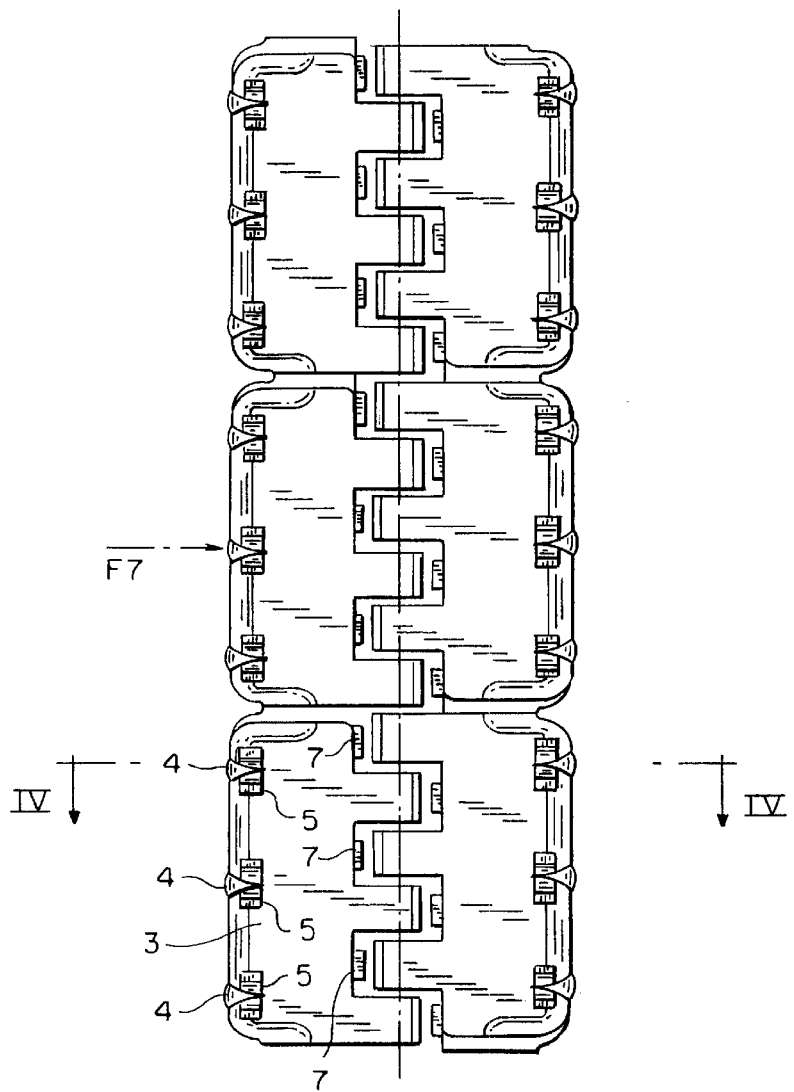
Figure 4:
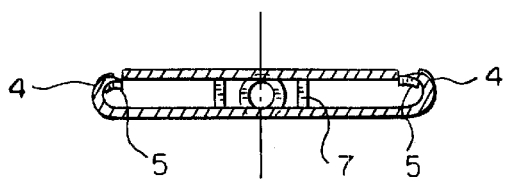

Document DE-A-832 366 shows fasteners such as these in FIGS. 1, 2, 3 and 4 (in particular claws 10, 11, 12, 13, FIG. 3 and claws 14, 15, 16, 17, FIG. 4).

Document U.S. Pat. No. 4,344,209 also shows claws 106, in FIG. 2.

A document FR-A-2 163 833 now in the public domain shows such fasteners, comprising curved claws which, once the fastener is set in place, cross through the conveyor belt completely and are bent back underneath it, and not under the lower part of the fastener (see p. 4114 to 4128).

However, since a gap between the two branches of the fastener is not excluded with such an arrangement, this patent envisaged using, in combination with the claws included in the fastener, classical twin point staples, whose aim is to ensure that during operation of the conveyor belt the two parts of the fastener forming the fixation plates do not separate in the case where the claws, in the way they are fitted, are not able to prevent such a separation.

Thus the aim of the present invention is to propose a conveyor belt fastener, whose fixation is ensured by claws which are part of the fastener itself, but not calling on, in combination, separate classical means of fixation, such as clamps, rivets, nut and screw systems, and not requiring for its fixation any previous piercing of holes in the end of the conveyor belt, as is the case, for example, for rivets which are often used.

Another aim of the invention is to propose a fastener as mentioned above, not comprising, once fixed on one end of the conveyor belt, any asperity beyond the bounds of the external faces of the fixation plates, which could be caught by a scraper like those used in many industries using conveyor belts.

This problem is solved by means of a fastener for conveyor belt joints comprising an upper fixation plate and a lower fixation plate, the two plates being linked along one of their edges by U-shaped hinge elements, leaving spaces between them for embedding similar hinge elements belonging to another similar fastener, a pin for linking and articulation linking being able to be introduced into the embedded hinge elements to produce the articulated fastener link, said fastener being provided with claws which are part of the upper fixation plate and are oriented towards the lower fixation plate, presenting a curve, or curves whose concavity is preferably oriented towards the hinge elements, characterised in that the lower plates comprise ports on their side opposite to the hinge elements, said ports being constituted of a small bar of the same material as that constituting the lower plate, oriented parallel to the edge of the lower plate situated opposite to the hinge elements and raised relative to the general plane of the lower plate, a shearing being practised on each side of the small bar, the edge of the lower plate situated opposite the hinge elements being raised and presenting a curved profile, the claws of the upper plate, the ports and the raised edge of the lower plate being arranged respectively in such a way that when the fastener, initially open, is closed, the points of the claws come up against the raised edge with a curved profile in its upper part, on the side of the raised edge with curved profile oriented towards the hinge elements of the fastener.

Figure 5:
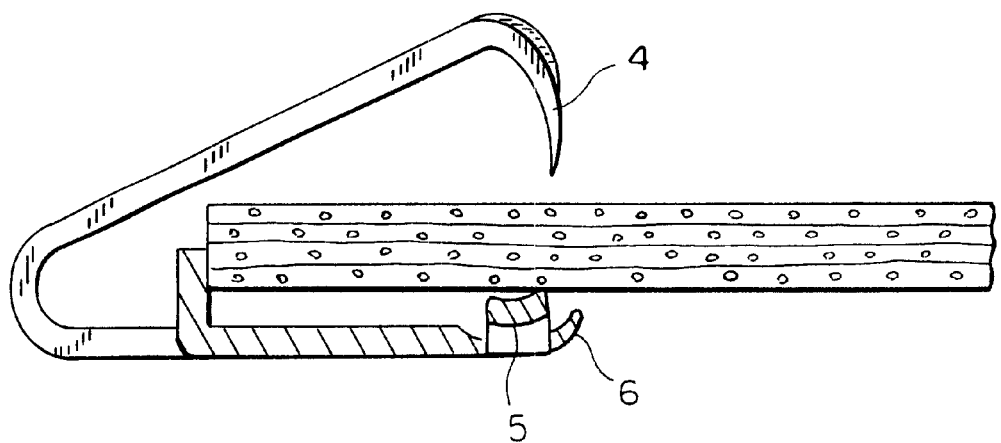
Figure 6:
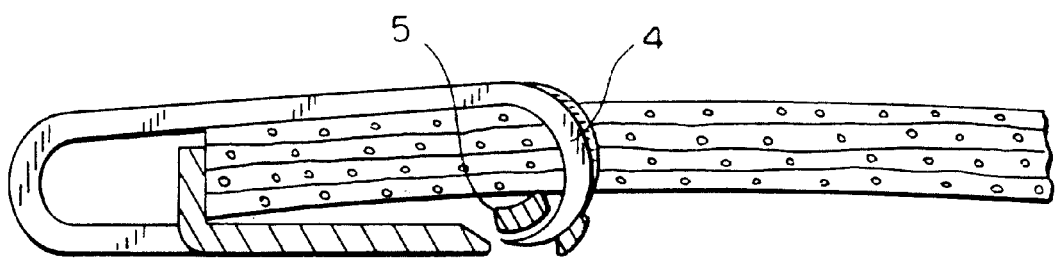
Figure 7:
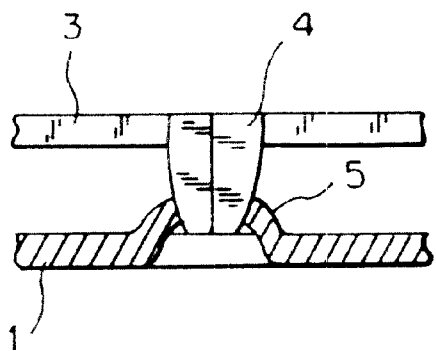
Figure 8:
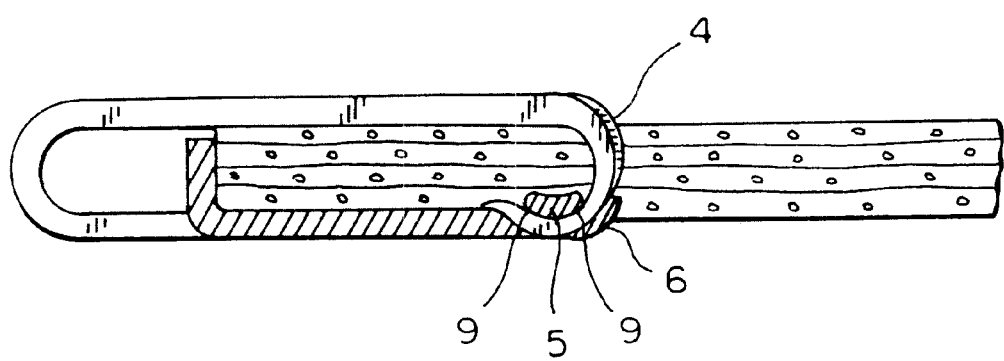

A particularly advantageous embodiment of the invention will now be described, as an illustrative but non-limiting example, in relation to the drawing in which:

FIG. 1 represents a fastener according to the invention, seen in perspective, FIG. 2 represents a band of fasteners as they emerge from the cutting-out and stamping press, presented as bands of fasteners;

FIG. 3 represents folded fasteners embedded one in the other by the hinge elements, FIG. 4 is a cross-section of the fasteners of FIG. 3 following the cutting line IV—IV of FIG. 3, FIGS. 5 and 6 show the fasteners being tightened on the end of a conveyor belt, FIG. 7 shows in detail, following the arrow F7 in FIG. 3, the fastener from the clawed side, tightened on the end of the conveyor belt, FIG. 8 shows the points of the claws engaged in the ports, deformed by a flattening of the ports.

In FIG. 1, the fasteners comprise a lower fixation plate 1 with U-shaped hinge elements 2. The upper fixation plates 3 comprise claws 4 slightly curved at the point and at the junction with the upper fixation plate 3. The lower fixation plates 1 comprise, on their side opposite that of the hinge elements 2, ports 5 and at one of their longitudinal ends, a half-port 5'. The stops 7 are to be noted, which will serve during the setting to block the fastener against the edge of the end of the conveyor belt. A particularly important element is the raised edge 6, which forms a single piece with the rest of the lower fixation plate 1. The raised edge 6 has a curved profile, both inside and outside and its inside curve is flush with the entry to the ports along it. This curved profile plays a role of general stiffener, but in particular the curve, on the inside, plays an essential role which, when the fasteners are placed, consists of guiding the points of the claws towards the entry of the ports by making them curve in the appropriate way, since, when the two halves of the fastener are each brought up against one of the respective faces of the end of the conveyor belt, the claws cross the thickness of the conveyor belt and their points come up against the internal curve of the raised edge 6, and bend progressively, the internal curve of the raised edge 6 acting as matrix.

Curved edge sections also exist between the bases of the claws on the edge of the upper fixation plate 3.

Other interesting details will appear in the description of the setting of the fasteners according to the invention.

In FIG. 2 one notes the claws 4, the ports 5, the future stops 7, the hinge elements 2, still flat at this stage, the raised edge curve 6. It is to be noted that the claws 4 have a "roof" profile obtained by stamping in the die cutting press, giving the claw greater strength.

In FIG. 3 the points of the claws 4 can be seen engaged in the ports 5, the straightened stops 7 being intended for blocking the end of the conveyor belt on which the fastener is fixed.

FIG. 4 is a cross section of the fasteners of FIG. 3 in which the elements already mentioned are identifiable through their references.

The setting of the fasteners will now be explained, together with the advantages obtained both during the setting of the fasteners and after the fastener has been fixed in place.

A first advantage comes from the fact that there is no need for any previous hole to be made before setting the fasteners. The latter are fixed on the ends of conveyor belts uniquely because of their claws, which cross through the thickness of the conveyor belt separating, if the problem arises, the reinforcement wires of the conveyor belts, without cutting them or even damaging them. Since no other separate classic fixation organ needing pre-made holes like rivets is necessary because of the grip of the points of the claws, explained below, the end of the conveyor belt on which such a fastener is fixed keeps its properties of traction resistance perfectly intact.

To set the fastener it suffices, as shown in FIGS. 5 and 6, to approach it astride the end of the conveyor belt, pushing it until the edge of the fastener comes up against the stop. The fastener can then be closed with a hammer, the lower fixation plate of the fastener being placed on a heavy plane surface, or by means of pneumatic or hydraulic pliers which are not specific to the fastener according to the invention. The claws 4 then cross through the thickness of the conveyor belt and, when they emerge from the conveyor belt, they come into contact with the internal curve of the raised edge of the curved profile. Since their points are already curved, they progressively curve even more following this internal curve of the raised edge and are lodged under the ports, going beyond the ports resting on the upper face of the internal fixation plate.

It is to be noted that when the fastener has been completely tightened, and closed over the end of the conveyor belt, the fixation of the fastener is obtained thanks on the one hand to the claws crossing through the thickness of the conveyor belt and on the other hand thanks to the raised edge curve of the lower fixation plate which, in conjugation with the edge curves situated between the bases of the claws of the upper fixation plate, grip the end of the conveyor belt tightly. This grip strengthens the hold of the fastener and contributes to a longer life for the joint obtained, by relieving the claws and by avoiding premature tears which otherwise could eventually occur under the effect of the strong traction forces applied to the claws and transmitted through the reinforcement of the conveyor belt. This grip also has the effect of coordinating the action of the claws by forming a dynamic link between them, which reduces individual traction forces which a single claw could be subject to, by sharing the overall traction between the ensemble of the claws.

Finally, one understands that the points of the claws 4 engaged under the small bars forming the ports 5 are retained by the latter against the vertical forces tending to open the claws and to undo the claws 4 from the end of the conveyor belt.

This is especially true, as shown in FIG. 8, at the time the fasteners are set, from the arrangement of the small bars of the ports 5 and the points of the claws 4, the small bars, while being partially embedded in the material of the lower face of the conveyor belt, deform by flattening slightly and thus pressing on the points of the claws 4 engaged underneath them, which provokes a double bend for the points of the claws 4 along the lower front and back ridges 9 of the flattened ports 5, this double bending resulting in a geometric locking of the ensemble port- claw point. In fact, any traction tending to extract the points of the claws 4 from the ports 5 will come up against a double blocking due to these ridges 9.

The fastener according to the invention thus achieves all the aims stated at the beginning. Evidently numerous variants are possible, while still remaining within the field of the attached claims.

What is claimed is:

1. Fastener for conveyor belt joints comprising an upper fixation plate (3) and a lower fixation plate (1), the two plates being linked together along one of their edges by hinge elements (2) in a U-shape, leaving between them spaces allowing similar hinge elements to be embedded belonging to another similar fastener, a linkage pin for articulation and linking being able to be introduced in the embedded hinge elements to create an articulated link between the fasteners, said fastener being provided with claws (4) which are part of the upper fixation plate (3), which are oriented towards the lower fixation plate (1) and which present a curve, or curves, whose cavity is oriented towards the hinge elements, characterised in that the lower plates (1) comprise on their side opposite the hinge elements (2) ports (5), said ports (5) being constituted of a small bar of the same material as that constituting the lower plate, oriented parallel to the edge of the lower plate situated opposite the hinge elements and raised in relation to the general plane of the lower plate, a shearing being made on each side of the small bar, the edge of the lower plate (1) situated opposite the hinge elements (2) being raised and presenting a curved profile, the claws (4) of the upper plate, the ports (5) and the raised edge (6) of the lower plate (1) being arranged respectively in such a way that when the fastener, originally open, is closed, the points of the claws (4) come into contact with the raised edge (6) with curved profile in its upper part, on the raised edge side with a curved profile oriented towards the hinge elements of the fastener.

2. Fastener according to claim 1, characterised in that the edges with a curved profile, oriented towards the lower fixation plate, are arranged on the upper fixation plates between the bases of the claws (4) of the side of the upper fixation plate, situated opposite the hinge elements.

3. Fastener according to claim 1, characterised in that the claws (4) have a "roof" profile.

\* \* \* \* \*